UNITED STATES PATENT OFFICE.

HENRY BOWER, OF PHILADELPHIA, PENNSYLVANIA; GEORGE R. BOWER ADMINISTRATOR OF SAID HENRY BOWER, DECEASED.

PROCESS OF RECOVERING CYANOGEN COMPOUNDS FROM GAS LIQUORS.

SPECIFICATION forming part of Letters Patent No. 560,965, dated May 26, 1896.

Application filed December 3, 1895. Serial No, 570,942. (No specimens.)

*To all whom it may concern:*

Be it known that I, HENRY BOWER, a citizen of the United States, residing at Philadelphia, in the county of Philadelphia and State of Pennsylvania, have invented certain new and useful Improvements in Methods of Separating the Cyanogen Compounds from Gas Liquors or other Solutions Containing Cyanogen Compounds; and I do hereby declare the following to be a full, clear, and exact description of the invention, such as will enable others skilled in the art to which it appertains to make and use the same.

My invention relates to improvements in methods of separating from gas or ammoniacal liquor the cyanogen compounds which it contains and in economically obtaining the sulfocyanid and ferrocyanid in separate form, available for the manufacture of the various commercial salts. I add to the ammoniacal liquor, while cold and before it has been heated or subjected to the action of an acid, metallic iron or a salt of iron, or both, in quantity sufficient to convert the hydrocyanic acid, present in any form, into ferrocyanid of iron, and the sulfocyanic acid, present in any form, into sulfocyanid of iron. I then run the mixture into a still or treating vessel provided with means for agitating its contents, add excess of lime to evolve ammonia, and distil the latter off by means of heat and agitation in any of the well-known methods for recovering ammonia. So far my process is similar to that described in Patent No. 259,802, issued June 20, 1882, jointly to myself and William L. Rowland. Having driven off the ammonia, I add to the liquor, which holds in solution ferrocyanid of calcium and sulfocyanid of calcium, an acidified solution of a salt of copper (preferably cuprous chlorid) sufficient to decompose the calcium, ferro, and sulfocyanids, a chlorid being chosen on account of forming a soluble salt of calcium, and a cuprous salt being preferred to a cupric salt because the cuprous sulfocyanid is insoluble. I thus obtain a precipitate containing ferrocyanid of copper and sulfocyanid of copper mechanically mixed. After separating the precipitate by settling, filtration, or other well-known means, I treat it while wet, and preferably by agitation, with a sufficient quantity of finely-divided metallic iron, as iron-filings or borings or "reduced iron," to decompose the copper salts, converting the ferrocyanid of copper and the sulfocyanid of copper, respectively, into ferrocyanid of iron, which is insoluble, and sulfocyanid of iron, which is in solution, and copper, which is in the metallic state. The ferrocyanid of iron, on being treated with an alkali, an alkaline salt, or an alkaline earth, gives as a result the ferrocyanids of the respective salt used, while the solution of sulfocyanid of iron, on being evaporated, yields crystals of sulfocyanid of iron; or this salt may be produced in an impure state by evaporating to dryness out of contact with the air.

The treatment of the sulfocyanid with iron filings, as mentioned above, when conducted under heat and pressure in a closed vessel or autoclave, causes the resultant metallic copper to combine with the sulfur of the sulfocyanid, producing sulfid of copper and ferrocyanid of iron.

While I have described my process for the treatment of sulfocyanids produced from gas or ammoniacal liquor, I do not desire to confine myself to a treatment of sulfocyanids produced in this way alone, for sulfocyanids produced in any other manner may be equally well treated by my process to produce sulfid of copper and ferrocyanid of iron.

Having thus described my invention, what I claim, and desire to secure by Letters Patent, is—

1. The process of recovering cyanogen compounds from the liquor from ammonia-stills containing soluble ferrocyanid and sulfocyanid, which consists in adding to the liquor a soluble copper salt to form insoluble ferrocyanid and sulfocyanid of copper, and then adding metallic iron to decompose the precipitate and form a solution of sulfocyanid of iron.

2. The process of producing sulfid of copper and ferrocyanid of iron from sulfocyanid of iron, which consists in heating the sulfocyanid of iron under pressure in a closed vessel in the presence of finely-divided copper.

In testimony whereof I affix my signature in presence of two witnesses.

HENRY BOWER.

Witnesses:
R. G. DYRENFORTH,
E. H. PARRY.